(12) United States Patent
Dangel et al.

(10) Patent No.: US 9,110,254 B2
(45) Date of Patent: Aug. 18, 2015

(54) METHOD AND SPACER FOR ASSEMBLING FLEXIBLE OPTICAL WAVEGUIDE RIBBONS, AND ASSEMBLED STACK OF SUCH RIBBONS

(75) Inventors: Roger F Dangel, Zurich (CH); Daniel S Jubin, Langnau am Albis (CH); Tobias P Lamprecht, Berneck (CH); Bert Jan Offrein, Schoenenberg (CH)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 13/255,261

(22) PCT Filed: Mar. 3, 2010

(86) PCT No.: PCT/IB2010/050918
§ 371 (c)(1),
(2), (4) Date: Sep. 8, 2011

(87) PCT Pub. No.: WO2010/103432
PCT Pub. Date: Sep. 16, 2010

(65) Prior Publication Data
US 2011/0317969 A1 Dec. 29, 2011

(30) Foreign Application Priority Data

May 11, 2009 (EP) .................................... 09154915

(51) Int. Cl.
*G02B 6/44* (2006.01)
*G02B 6/38* (2006.01)
*G02B 6/10* (2006.01)

(52) U.S. Cl.
CPC ............... *G02B 6/3885* (2013.01); *G02B 6/10* (2013.01); *G02B 6/3839* (2013.01); *G02B 6/3861* (2013.01); *Y10T 29/49826* (2015.01)

(58) Field of Classification Search
CPC combination set(s) only.
See application file for complete search history.

(56) References Cited

U.S. PATENT DOCUMENTS

| 5,281,305 | A  | 1/1994  | Lee et al.        |        |
|-----------|----|---------|-------------------|--------|
| 6,799,900 | B2 | 10/2004 | Shiino et al.     |        |
| 7,108,431 | B2* | 9/2006 | Yang et al.       | 385/78 |

(Continued)

FOREIGN PATENT DOCUMENTS

| JP | 11183747   | 7/1999  |
| JP | 2002303761 | 10/2002 |

(Continued)

OTHER PUBLICATIONS

Letter from IBM Japan which indicates the references that were cited in the Office Action.

(Continued)

*Primary Examiner* — Tina Wong
*Assistant Examiner* — Chad Smith
(74) *Attorney, Agent, or Firm* — Scully, Scott, Murphy & Presser, P.C.; Jennifer R. Davis, Esq.

(57) ABSTRACT

A method and spacer for assembling flexible optical waveguide ribbons and assembled stack of such ribbons. The method includes the steps of: providing at least two optical waveguide ribbons and a spacer, which includes at least two calibrated spaces; positioning a ribbon stack in the spacer, where the ribbon stack includes the at least two optical waveguide ribbons stacked on top of each other; constraining positioned ribbon stack in one of the calibrated spaces; and fixing constrained ribbon stack in the calibrated spaces.

19 Claims, 11 Drawing Sheets

(56) References Cited

U.S. PATENT DOCUMENTS

| | | |
|---|---|---|
| 7,295,743 B2 | 11/2007 | Yatsuda et al. |
| 7,397,995 B2 | 7/2008 | Blauvelt et al. |
| 7,457,499 B2 | 11/2008 | Russert et al. |
| 2002/0146213 A1* | 10/2002 | Shigenaga et al. ............... 385/78 |
| 2002/0168150 A1 | 11/2002 | Shino et al. |
| 2003/0174998 A1* | 9/2003 | Shevchuk .................... 385/137 |
| 2004/0086255 A1 | 5/2004 | Botet et al. |
| 2006/0045444 A1 | 3/2006 | Miller et al. |

FOREIGN PATENT DOCUMENTS

| | | |
|---|---|---|
| JP | 2002333549 | 11/2002 |
| JP | 200335841 | 2/2003 |
| JP | 2003185873 | 7/2003 |
| JP | 200639282 | 2/2006 |
| JP | 2007212973 | 8/2007 |
| WO | WO02/48752 A2 | 6/2002 |
| WO | WO2005/079502 A2 | 9/2005 |

OTHER PUBLICATIONS

Usui, M., et al., "An optical coupling technique for parallel optical interconnection modules using polymeric optical waveguide films", IEMT/IMC Symposium, 2nd 1998, vol., No., pp. 127-132, Apr. 15-17, 1998.

Kim, J., et al. "Stacked polymeric multimode waveguide arrays for two-dimensional optical interconnects," Lightwave Technology, Journal of, vol. 22, No. 3, pp. 840-844, Mar. 2004.

Coosemaus, T., et al., "Fabrication of a 2D connector for coupling a 4x8 array of small diameter plastic optical fiber (117/125 μm) to RCLED or VCSEL arrays, " Electronic Components and Technology Conference, 2000, 2000 Proceedings $50^{th}$, vol. No., pp. 1236-1241, 2000.

Streppel, U., et al., "Development of a New Fabrication Method for Stacked Optical Waveguides Using Inorganic-Organic Coploymers," Polymers and Adhesives in Microelectronics and Photonics, 2001 First International IEEE Conference on, vol., No., pp. 329-335, 2001.

Naessens, K., et al., " Microgroove Fabrication with Excimer Laser Ablation Techniques for Optical Fiber Array Alignment Purposes," Proc. SPIE 4088, pp. 327-332, 2000.

Suematsu, K. et al., "Super Low-Loss, Super High-Density Multi-Fiber Optical Connectors," Furukawa Review, No. 23, pp. 53-58, 2003.

* cited by examiner

S10

SpF

S21

SpF

S22

SpF

S23

S50, S52

S21

S22

S50, S52

METHOD AND SPACER FOR ASSEMBLING FLEXIBLE OPTICAL WAVEGUIDE RIBBONS, AND ASSEMBLED STACK OF SUCH RIBBONS

CROSS-REFERENCE TO RELATED APPLICATION

This is a U.S. National Stage application under 35 U.S.C. §371 based on International Application No. PCT/IB2010/050918, filed Mar. 3, 2010, published under PCT Article 21(2) and claiming priority from European Patent Application No. 09154915.4, filed Mar. 11, 2009.

TECHNICAL FIELD

The present invention relates to a method and spacer for assembling flexible optical waveguide ribbons, as well as an assembled stack of such ribbons.

BACKGROUND OF THE INVENTION

An optical waveguide is meant to guides electromagnetic waves in the optical spectrum. Optical waveguides notably include optical fibers and rectangular waveguides. They are used as components in integrated optical circuits or as transmission medium in optical communication systems. Such waveguides are usually classified according to their geometry, mode structure, refractive index distribution and material. Of particular interest are the flexible optical waveguide ribbons.

A number of prior art documents relate to this background. For example:
  U.S. Pat. No. 5,281,305 B1 discloses a method for producing stacked optical waveguides in a silicon dioxide substrate.
  U.S. Pat. No. 5,937,128 B1 is directed to a waveguide connector and a method of forming a waveguide connector;
  U.S. Pat. No. 6,317,964 B1 discloses a waveguide connector and a method and arrangement for aligning the waveguide connector to at least one optical device.
  U.S. Pat. No. 6,496,624 B1 relates to an optical waveguide device for optical wiring and manufacturing. Here, a polymeric waveguide comprises a film-shaped optical waveguide.
  U.S. Pat. No. 6,695,488 B2 discloses a tool and a method for forming a multi fiber ferrule. The multi fiber optical ferrule is formed of two ferrule halves.
  U.S. Pat. No. 6,990,263 B2 discloses a connector-integrated type polymer optical waveguide and a method and a mold for producing the same.
  U.S. Pat. No. 7,295,743 B2 discloses an optical waveguide, an optical waveguide ferrule and an optical connector.
  U.S. Pat. No. 7,397,995 B, is directed to a multiple-core planar optical waveguide is disclosed. Overlapping portions of the waveguide cores are positioned one above the other and substantially parallel.
  U.S. Pat. No. 7,457,499, discloses a method and apparatus are described, which permit the manufacture of an end of an optical fiber bundle.
  US 2006/0045444 A1, relates to fiber bundles and methods for making fiber bundles.
  WO/02/48752 relates to a low-profile waveguide assembly for interfacing a two-dimensional optoelectronic array to standard fiber bundles.
  WO/2005/079502 is directed to a connector, wherein two impacts mounted seven optical fiber ferrules are aligned through the alignment of the central optical fiber and the alignment of at least one of the outer optical fibers in the ferrules.

Similarly, a vast literature (non-patent document) is directed to the general background. For example:
  "An optical coupling technique for parallel optical interconnection modules using polymeric optical waveguide films", Usui, M.; Hikita, M.; Yoshimura, R.; Matsuura, N.; Sato, N.; Ohki, A.; Kagawa, T.; Tateno, K.; Katsura, K.; Ando, Y., DOI: 10.1109/IEMTIM.1998.704538, directed to the development of a new optical coupling technique for Para BIT modules using polymeric optical waveguide films.
  "Stacked polymeric multimode waveguide arrays for two-dimensional optical interconnects", Joon-Sung Kim; Jang-Joo Kim, DOI: 10.1109/JLT.2004.824523, wherein 2-D polymeric multimode waveguide arrays with two reflection-mirrors have been fabricated for optical interconnects between 2-D arrayed vertical-cavity surface-emitting lasers and detectors.
  "Super Low-Loss, Super High-Density Multi-Fiber Optical Connectors", Katsuki Suematsu, Masao Shinoda, Takashi Shigenaga, Jun Yamakawa, Masayoshi Tsukamoto, Yoshimi Ono and Takayuki Ando, Furukawa Review, No. 23, 2003, pages 53 to 58, authors have developed super low-loss, super high-density connectors, and assembly technology based on innovative high-precision molding technology.
  In the document entitled "Fabrication of microgrooves with excimer laser ablation techniques for plastic optical fiber array alignment purposes", K Naessens, A Van Hove, T Coosemans, S Verstuyft, Proc. SPIE, Vol. 3933, 309 (2000); DOI:10.1117/12.387568, authors present laser ablation as a fabrication method for micro machining in of arrays consisting of precisely dimensioned U-grooves in dedicated polycarbonate and polymethylmetacrylate plates. The fabricated plates are used to hold optical fibers by means of a UV-curable adhesive. Stacking and gluing of the plates allows the assembly of a 2D connector of plastic optical fibers for short distance optical interconnects.
  "Development of a new fabrication method for stacked optical waveguides using inorganic-organic copolymers", Streppel, U., Dannberg, P., Wächter, C., Bräuer, A., Nicole, P., Fröhlich, L., Houbertz, R., Popall, M., Institute of Electrical and Electronics Engineers-IEEE-: Polytronic 2001, International Conference on Polymers and Adhesives in Microelectronics and Photonics. Proceedings. New York, N.Y.: IEEE, 2001, pp. 329-335, presents a technology for the stacking of optical waveguides using hybrid inorganic-organic polymers (ORMOCEROs).
  "Fabrication of a 2D connector for coupling a 4×8 array of small diameter plastic optical fiber (117/125 µm) to RCLED or VCSEL arrays", Coosemaus, T. Van Hove, A. Naessens, K. Vanwassenhove, L. Van Daele, P. Baets, R., Dept. of Inf. Technol., Ghent Univ., as appears in: Electronic Components and Technology Conference, 2000. DOI: 10.1109/ECTC.2000.853332, authors discuss 2D parallel fiber arrays and report on the fabrication of a prototype 2D-connector that can be replicated using standard molding techniques.

This being said, it is still a challenge to provide a method or a tool for assembling flexible optical waveguide ribbons with controlled positioning. It is a further challenge to reliably and efficiently provide an assembled stack of such ribbons with tolerances in the positioning of a few micrometers (μm) only.

SUMMARY OF THE INVENTION

According to a first aspect, the invention is directed to a method for assembling flexible optical waveguide ribbons, comprising steps of: providing at least two optical waveguide ribbons and a spacer, the spacer providing at least two calibrated spaces; positioning in the spacer one of the ribbons stacked on the other ribbon; and constraining the positioned ribbon in a respective one of the calibrated spaces and fixing the constrained ribbon on the other ribbon.

In other embodiments, the said method may comprise one or more of the following features:
- at the step of constraining and fixing, said one of the ribbons is fixed through an adhesive in the spacer;
- the step of constraining and fixing further comprises filling the adhesive in the spacer;
- at the step of providing, each of the ribbons is provided with a free-standing portion at one end, and the spacer comprises at least two recesses, each of which defines a respective calibrated space; the step of constraining comprises inserting each free-standing portion in a respective one of the recesses; and the step of fixing comprises fixing each of the constrained ribbons about a respective one of the recesses;
- at the step of providing, each of the ribbons further comprises a substrate and a cladding thereon, optical waveguides being arranged in the cladding, the method further comprising, prior to positioning, a step of: preparing each free-standing portion by partial removing or delamination of the substrate at one end of each of the ribbons;
- the method further comprises a step of: cutting a section through the fixed ribbons;
- the spacer is provided as a ferrule with through hole recesses integrated therein;
- the spacer provided comprises a receptacle and a spacer element, the spacer element comprising the recesses; and the step of positioning comprises inserting: both the spacer element and ribbons in the receptacle, and each free-standing portion in a respective one of the recesses;
- the spacer provided comprises both a receptacle and a spacer element; and the step of positioning comprises positioning one of the ribbons in the receptacle; and engaging a portion of the spacer element in the receptacle onto the positioned ribbon, until a calibrated space is achieved between the engaged portion and the receptacle, and wherein: the step of constraining and fixing comprises constraining and fixing the positioned ribbon in the achieved calibrated space;
- constraining and fixing the positioned ribbon further comprises exposing it to an adhesive, and curing the adhesive;
- the step of constraining and fixing the second ribbon further comprises irradiating the adhesive through the spacer element;
- the method further comprises repeating the steps of positioning, constraining and fixing such as to obtain a N+1th ribbon fixed with respect to a Nth ribbon; and
- at the step of fixing the ribbons, the spacer is calibrated such that a tolerance in the positioning, after fixing, of said one of the ribbons is less than ±10 μm, and preferably less than ±5 μm.

The invention is further directed, in a second aspect thereof, to an assembled stack of flexible optical waveguide ribbons, likely to be obtained according to the first aspect of the invention, wherein, at an end section of the stack, each of the ribbon end sections is calibrated in a respective calibrated section.

The invention is further directed, in a third aspect thereof, to an optical connector comprising the stack of flexible optical waveguide ribbons according to the second aspect of the invention.

According to still another aspect, the present invention is embodied as a spacer for assembling flexible optical waveguide ribbons, the spacer having at least two calibrated spaces, wherein the spacer is configured to allow for: positioning the ribbons in the spacer; constraining the ribbons in a respective one of the calibrated spaces; and fixing the ribbons.

A method, and notably a spacer and an assembled stack of optical waveguide ribbons embodying the present invention will now be described, by way of non-limiting example, and in reference to the accompanying drawings.

DETAILED DESCRIPTION OF THE PREFERRED EMBODIMENTS

As an introduction to the following description, it is first pointed at a general aspect of the invention, directed to a method for assembling flexible optical waveguide ribbons.

Basically, optical waveguide ribbons (also called flexes) are first positioned in a spacer, such that one ribbon is stacked on another one. Then, a given ribbon is constrained in a respective calibrated space of the spacer, before being fixed. Accordingly, the fabrication tolerances of individual waveguide ribbons do not sum-up along the stack. This holds for any vertical imprecision in the positioning of the ribbons. Constraining the layers can for instance be set and/or reinforced by means of an adhesive, e.g. by filling in a space left vacant in the spacer after positioning the elements. The overall precision of the stack is thus easily kept under control. The other way round, requirements for individual layer thickness control can be relaxed. Remarkably, the various layers can be positioned e.g. all at once or one by one, according to embodiments that will be discussed in details below.

Figure 1:
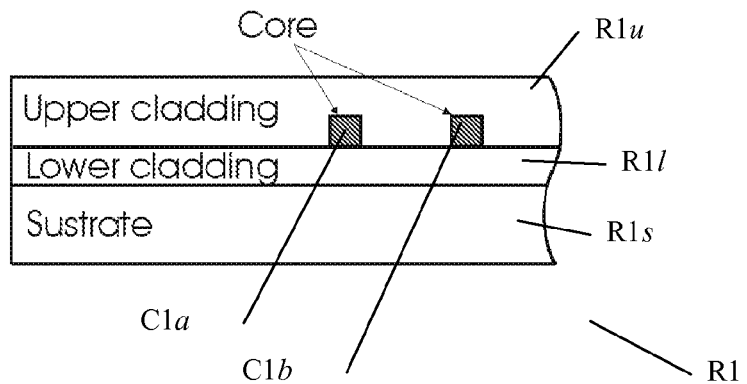
FIG. 1, a lateral cut through a single waveguide ribbon.

FIG. 1 shows a lateral cut through a single waveguide ribbon R1. The optical waveguide includes M optical waveguide cores C1$a$, C1$b$, . . . , for transmitting optical signals. The said cores are located in a cladding R1$u$, R11, above a substrate R1$s$. More precisely, the cladding decomposes as an upper cladding (R1$u$), comprising the cores, and a lower cladding R11. Such ribbons are known per se.

Figure 2:
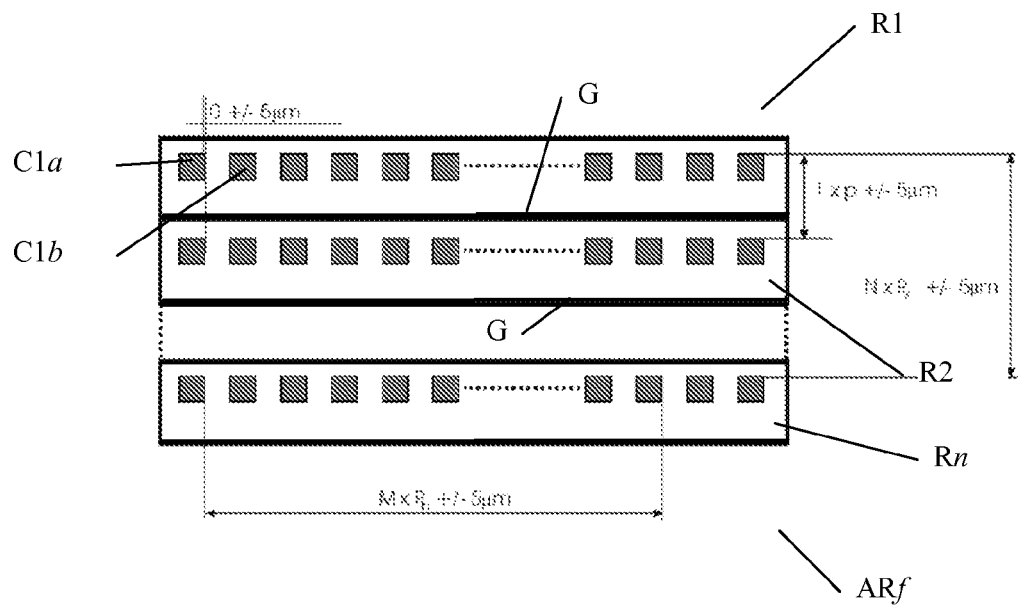
FIG. 2, a lateral cut through a stack of N waveguide ribbons.
Figure 3:
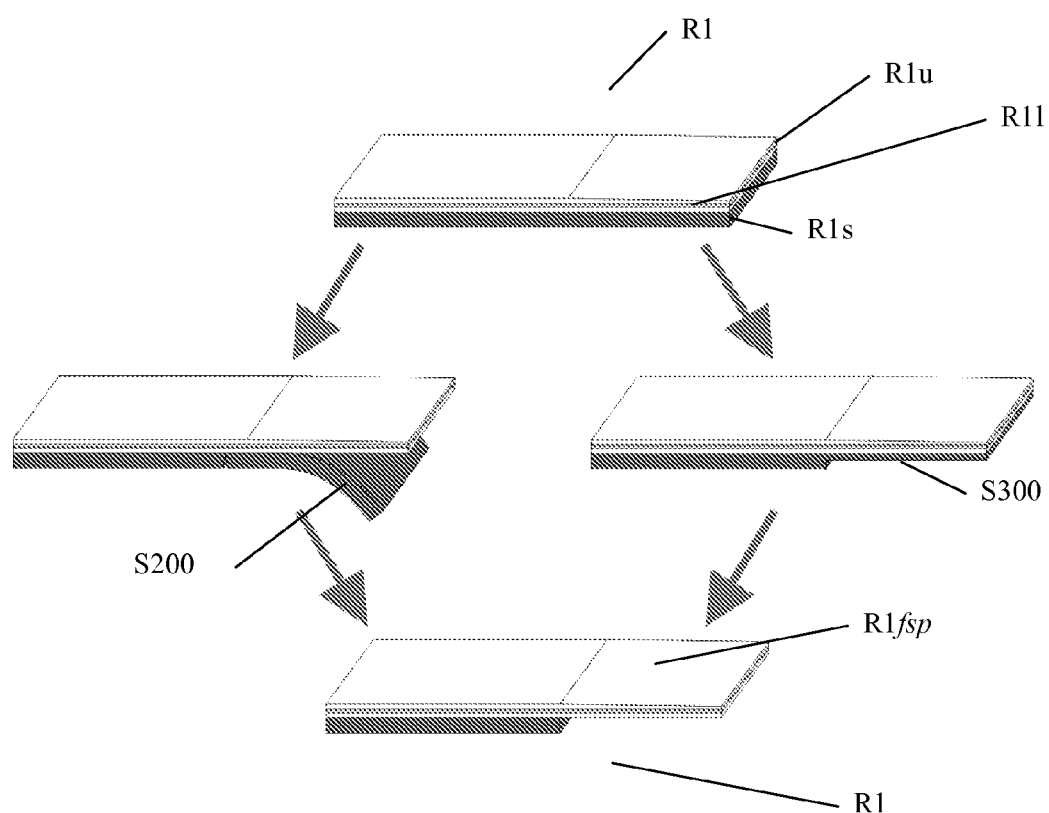
FIG. 3, two variants for preparing waveguide ribbons with a free-standing portion at one end thereof, according to embodiments of the present invention.
Figure 4:
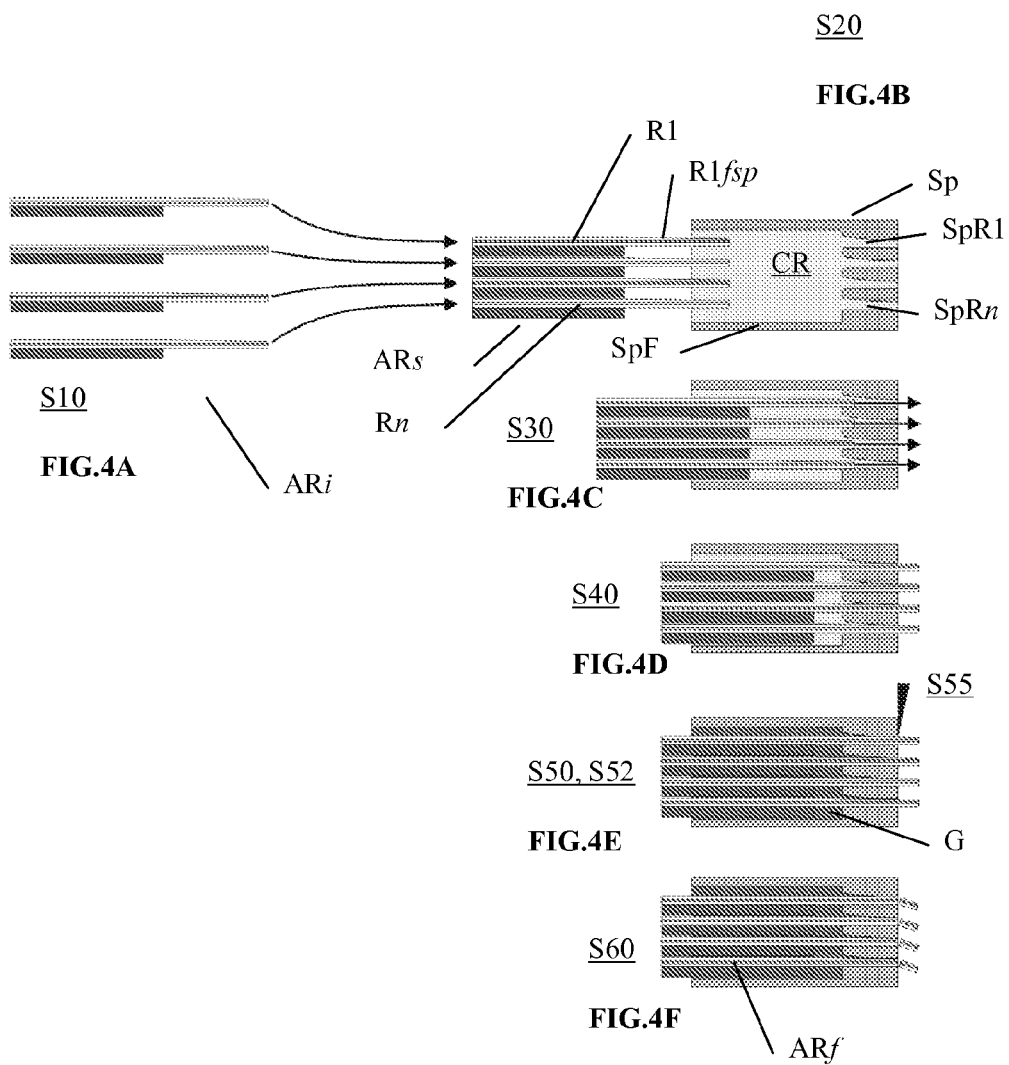
FIGS. 4A-4F, steps for assembling flexible optical waveguide ribbons, according to an embodiment of the present invention.

FIG. 2 shows a lateral cut through a stack ARf of N waveguide ribbons R1-Rn, arranged directly above one another. Embodiments as described below aim at assembling a stack as schematically depicted in this drawing.

Broadly, the section shown is a section view of an end of an assembled stack of flexible optical waveguide ribbons, likely to be obtained according to embodiments of the present invention. At the level of the said section, each of the ribbon is fit in a respective calibrated section, here represented by a rectangle.

Each waveguide ribbon comprises M optical waveguides, as described above. Optical waveguides (e.g. C1$a$, C1$b$, . . . ,) within each waveguide ribbon Rn are arranged longitudinally and in parallel to each other, in a given interval or pitch Ph. This interval may, for example, amount to 250 µm or less, with a precision of ±5 µm or better, i.e. ±1-2 µm.

Waveguide ribbons are provided with substantially the same predetermined thickness. Here, their thickness is likely smaller than the vertical pitch Pv contemplated. A typical value for Pv is 250 µm. More precisely, typical values for the various layers in a single ribbon are:

Substrate: 100 µm
Lower cladding: 30-40 µm
Core: 40-50 µm
Upper cladding (above the core): 30-40 µm Consequently the ribbon thickness is of about 200-230 µm, i.e. smaller than Pv. Typical tolerances as contemplated herein for a stack of ribbons or an optical connector are mentioned in FIG. 2, using usual notations for a person skilled in the art. The reference G pertains to a preferred embodiment, to be evoked later.

Obviously, each layer cannot have a perfectly constant thickness and be perfectly planar. Yet, embodiments of the present invention results in that each layer is adjusted to a respective calibrated space, whereby effects of such inaccuracies are mitigated. How this is achieved shall become apparent in the following description.

A first general embodiment, in which ribbons are assembled all at once, is now described in reference to FIGS. 3-7.

First, optical waveguide ribbons and a spacer are provided. Preferably, each ribbon Rn has a free-standing portion at one end. An example of a free portion is denoted by the reference R1$fsp$ in FIG. 3, and more generally by Rn$fsp$ in other figures. Such a free-standing portion can for instance be obtained by partial removing (step S300 in FIG. 3) of the substrate, for example by laser ablation, or by delamination (alternate step S200) of the substrate R1$s$. An end of the ribbon R1 is accordingly thinned at the level of the portion R1$fsp$. First, this enables an easier positioning and insertion of the ribbons in the spacer. Second, and all the more, this further allows for easier machining of the spacer, as to be explained below, in reference to FIGS. 4A-4F.

Now, in reference to FIGS. 4A-4F, the lateral cut of the ribbons Rn depicted clearly shows the thinned substrates, as discussed above. Their shapes can be further appreciated in the 3D views of FIG. 5.

The ribbons provided form an assembly ARi, which is not yet necessarily stacked (S10, FIG. 4A). Ribbons are thus stacked to form a more compact assembly ARs, see FIG. 4B. The subsequent stack can hence more easily be inserted in the spacer Sp, step S20, FIG. 4B.

The spacer depicted is suitably designed for assembling the ribbons. It comprises calibrated spaces (SpRn), here defined by recesses. Note that in the examples of FIG. 4, the recesses are integrated in the body of the spacer, i.e. a ferrule SpF. Typically, a master is created, for subsequent molding of the ferrule. The master is typically thin reamed, drilled, or milled. Then, the ferrule can be obtained by injection molding in the master. As a result, the recesses obtained are integrate in the body of the spacer. Note that the recesses are here defined by substantially parallel tongues. Typically, the said tongues are 3 mm wide, while the recesses are typically 100-150 µm thick.

The ferrule further defines a room which allows for inserting the stacked assembly ARs, or say, for pre-positioning the ribbons in the spacer, as illustrated at step S20.

Figure 5:
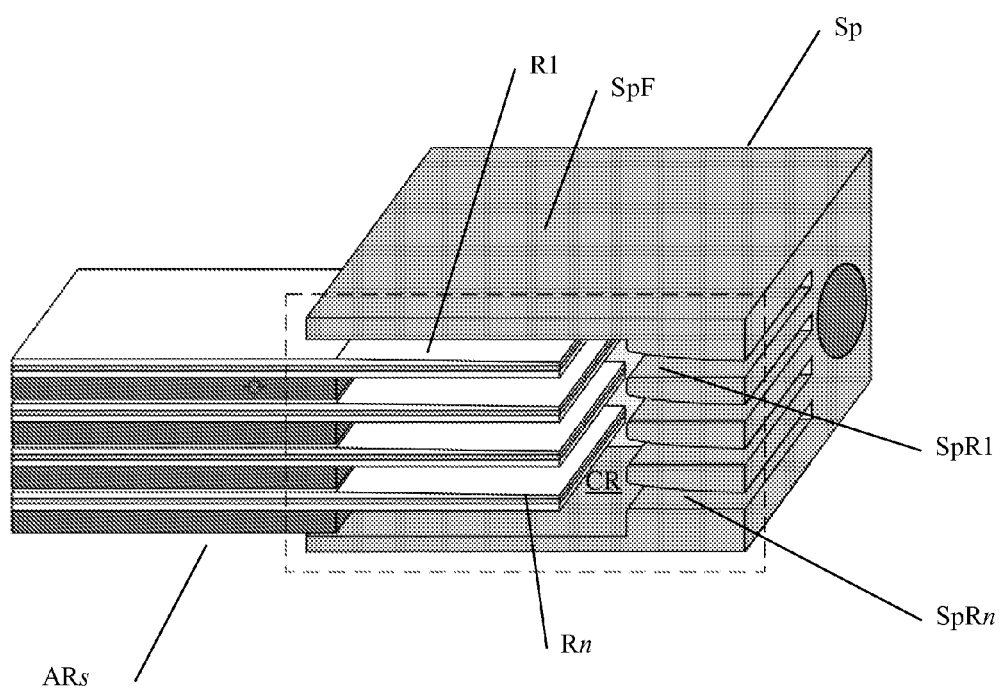
FIG. 5, a 3D view of a spacer and a stack of ribbons, at a given step of their assembly, according to the embodiment of FIGS. 4A-4F.
Figure 6:
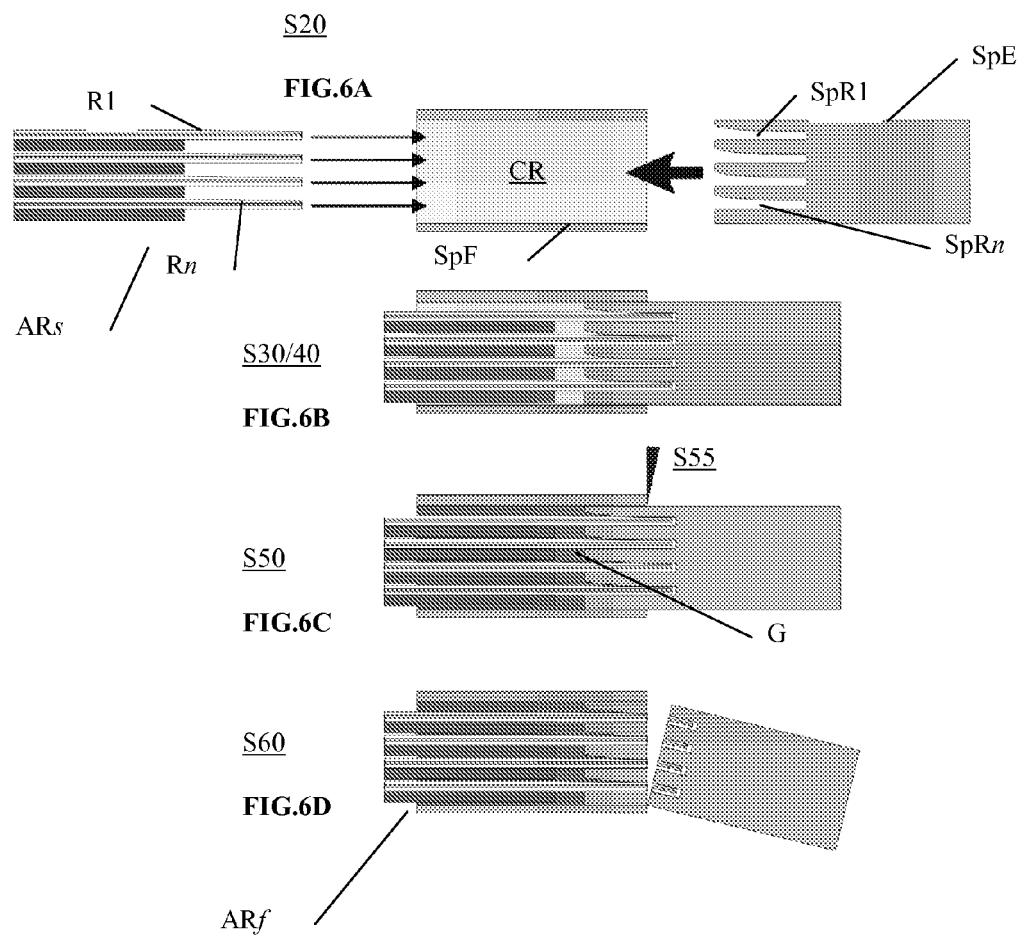
FIGS. 6A-6D, steps for assembling flexible optical waveguide ribbons, according to a variant of the embodiment of FIGS. 4A-4F.

Advantageously, the recesses can further be designed as through holes, that is, they have two open ends, as to be seen in the lateral cuts of FIGS. 4B-4F, see also FIG. 5 for a 3D view. Not only this might be simpler to manufacture than blind holes, but this may further simplifies the finishing of the stack, after fixation thereof, as shall be apparent in FIG. 4E-F.

The recesses SpRn can be conveniently shaped to insert the free portions of the ribbons Rn therein, step S30 in FIG. 4C. In this respect, providing ribbons with thinned free end portions makes their positioning in the spacer easier, as already evoked. In addition, it further allows for more affordable machining of a spacer, such as described herein. This becomes especially true when the recesses defining calibrated spaces are to be built in a single-piece with the ferrule body, as in the embodiment of FIGS. 4A-F. Indeed, since the recesses and the free portions are typically 100-150 µm thick, reasonable yields of machining can be contemplated. In other words, without thinning the end portions of the ribbons, the tongues which define the recesses would have to be thinner, which is more difficult to manufacture.

Thus, free ends can easily be received in respective recesses of the spacer (steps S30/40 in FIGS. 4C-D), whereby a final position is ascertained (here the ends of the free portions slightly overtake on the outside of the right-hand side wall of the spacer). In other words, each ribbon Rn is now constrained at one end within a respective calibrated space and is ready to be fixed. In addition, the stack is itself positioned in the overall calibrated room CR of the ferrule.

At this point, ribbons are still somehow embrittled at the level of their free portion and not yet fixed. This can be set by further constraining the ribbons about the recesses, step S50 in FIG. 4E, e.g. though an adhesive G. As noted earlier, the adhesive G can be e.g. filled in the space left vacant in the spacer and is likely to fill the spaces formerly occupied by the ribbon substrates. In addition, it shall further constrain free end portions of the ribbons to nominal positions defined by the recesses. In this regards, as to be seen in FIGS. 4E-F, the recesses might be designed such that, upon filling, the adhesive urges each free portions of the ribbons towards a given wall (here the lower flat wall of a recess, as viewed in section, in FIGS. 4E-F). To this aim, the upper wall may have a slightly curved section, with a fading flare.

Accordingly, once cured or dry, step 52, the adhesive fixes the ribbon stack at one end, and possibly sets the ribbon ends more precisely.

Next, finishing is obtained by cutting (step S55-S60, FIGS. 4E-F) a section through the fixed ribbons, e.g. the overtaking ends thereof, as depicted. The resulting stack has now a clean end section. Viewed from the right, the ribbon end section would fit into calibrated sections, i.e. rectangles, as evoked earlier in reference to FIG. 2. Reverting shortly to the latter figure, it can be seen that space left vacant by a ribbon is likely filled by the adhesive (as denoted by thick line and reference G).

In FIG. 5, a 3D view of the spacer Sp and the stack ARs is shown, while the stack is being inserted in the hollow space of the ferrule SpF. That is, at some point between step S20, FIG. 4B, and step S30 of FIG. 4C. The dashed rectangle depicted therein denotes the lateral cut plane of FIGS. 4A-4F. As already visible in the latter figures, the recesses SpRn preferably exhibits a slight flare on the insertion side. Their overall dimensions is else determined by the ribbons, the precision sought in their vertical stack, the material used for machining the spacer and machining precision, as can be appreciated by a skilled person.

In this respect, the material of the ferrule body preferably comprises ceramic or glass parts, which are likely thermally stable, suitably hard and durable. For instance, ceramic parts (e.g. 80% of the ferrule body mass) may be dispersed in a polymer matrix, such as a Polyphenylene Sulfide (PPS) or Epoxy.

Incidentally, it is noted that while embodiments recite first positioning the ribbons and then constraining them, it shall be apparent to the skilled person that the corresponding steps can be concomitant (at least partly) or even interlaced.

Next, FIGS. 6A-6D illustrate steps for assembling flexible optical waveguide ribbons, according to a variant of the previous embodiment, as described in reference to FIGS. 4A-4F. Basically, an overall idea remains the same, i.e. positioning a stack of ribbons in the spacer (steps S20-S40, FIGS. 6A-6B), and then constraining them (step S30-S50, FIGS. 6B-6C) in a respective calibrated space before fixing (step S52).

The main difference here is that the spacer now comprises two distinct elements, i.e. a receptacle SpF or ferrule and a spacer element SpE, it being noted that the recesses SpRn are provided in the spacer element.

Accordingly, positioning the various components (steps S20-S30, FIGS. 6A-6B) now requires to insert both the spacer element SpE and ribbons in the receptacle SpF (step S20). Yet, the free-standing portions of the ribbons are inserted in respective recesses (steps S30-S40, FIG. 6B), just as in the previous embodiment.

Accordingly, cutting a section through the fixed ribbons may be achieved by cutting a section through the spacer element SpE as well (step S55, FIG. 6C). Here, the spacer element portion which is cut is lost. However, such a variant is advantageous inasmuch as it allows for an easier machining of the ferrule and its components, in particular the spacer SpE.

Figure 7:
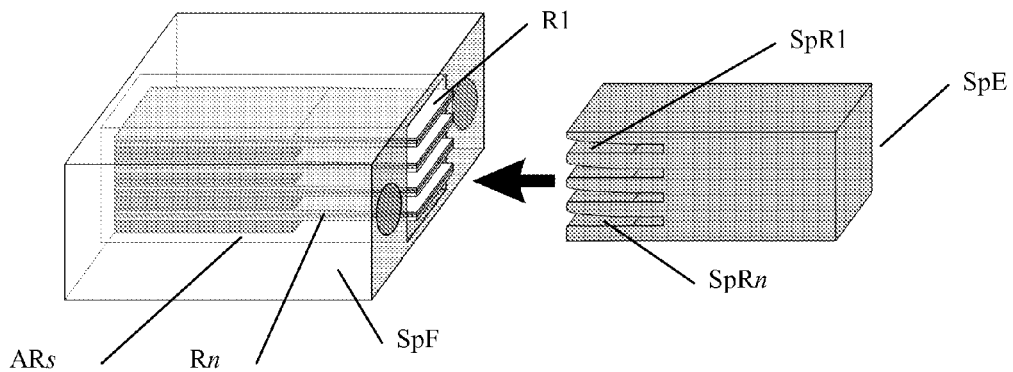
FIG. 7, a 3D view of a spacer and a stack of ribbons, at a given step of their assembly, according to the variant of FIGS. 6A-6D.

FIG. 7 shows a 3D view of the components of the spacer SpE, SpF, according to the variant of FIGS. 6A-6D. Here, it can be noted that the recesses SpRn do not need anymore to be provided as through holes.

Another embodiment shall now be described, wherein ribbons are calibrated one by one instead of being positioned all at once.

Figure 8:
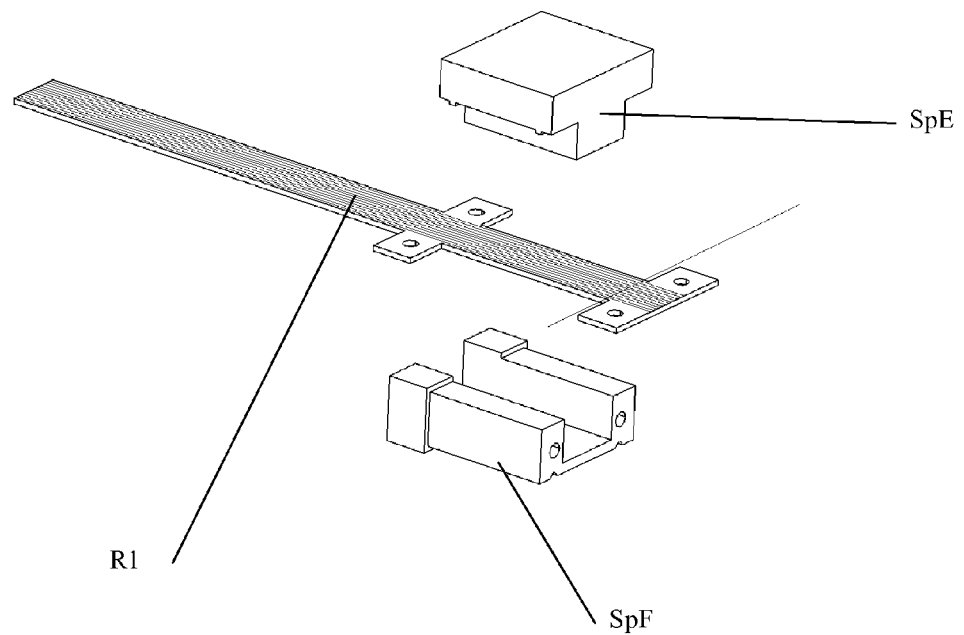
FIG. 8, an exploded view of a spacer and a ribbon, as used in the embodiment of FIGS. 10A-10I.

FIG. 8 schematically depicts an exploded view of a spacer and a single ribbon, suitable for such an embodiment.

As just above, the spacer comprises two parts, i.e. a receptacle SpF (or ferrule) and a spacer element SpE. The ferrule still defines a room (open) which allows for inserting a given ribbon, or say, for pre-positioning the said ribbon, as suggested by the exploded view. Yet, instead of having calibrated spaces defined by recesses, the spacer element SpE is now designed as a stamp, with a T-section, partly complementary of the U section of the receptacle SpF. It shall accordingly be referred to as a stamp in the following, for the sake of illustration.

Figure 9:
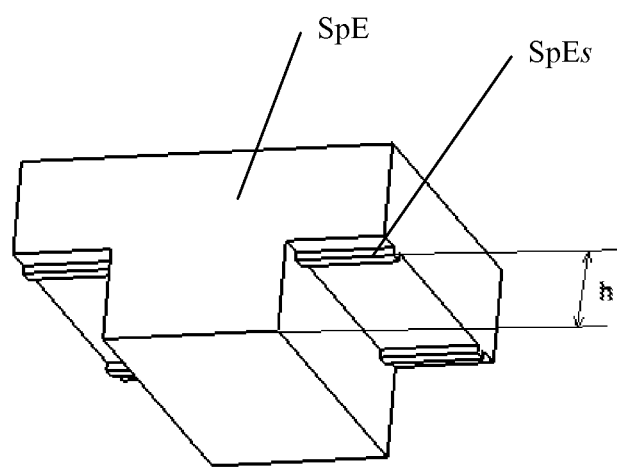
FIG. 9, a 3D view of a spacer element of a spacer element of the spacer of FIG. 8.

An example of stamp SpE can further be seen in FIG. 9, showing a 3D view of the same stamp as in FIG. 8.

As suggested by FIG. 8, after positioning a ribbon R1 (or Rn) in the receptacle, a portion of the stamp SpE can be slidably engaged in a section of the receptacle, onto the previously positioned ribbon. Now, dimensions are suitably chosen such that e.g. edges of the stamp shall prevent its lower wall to reach the upper wall of the receptacle. A calibrated space can accordingly be defined between the lower wall of the engaged portion of the stamp and the upper wall of the receptacle. The inserted ribbon will thus be urged to fit in the said calibrated space and subsequently fixed therein.

This can be repeated at pleasure, in order to adjust successive layers of the ribbon stack, provided that a calibrated space can be maintained at each stage of the process. To this aim, the most efficient operation mode is perhaps to provide a set of stamps, with slightly different heights (as denoted by h in FIG. 9).

For instance, the height $h_{N-1}$ of the engaged portion of the $N+1^{th}$ stamp could be that of the $N^{th}$ stamp minus the height $e_{N+1}$ of the space calibrating the layer N+1, i.e. $h_{N+1} = h_N - e_{N+1}$. Yet, as the height e is typically the same at each layer, one likely has $h_{N+1} = h_N - N$ e, whereby a constant calibrated space is provided throughout.

In a variant, the stamp can be provided with a set of stands SpEs, e.g. self-adhesive, with various dimensions. Yet, stands are already advantageous, even when using a set of different stamps, as it allows for minimizing influence of dust particles present on receiving surfaces. There, one would likely the same stands for each of the stamps.

Next, FIGS. 10A-10J illustrate steps according to the second main embodiment.

Figure 10A:
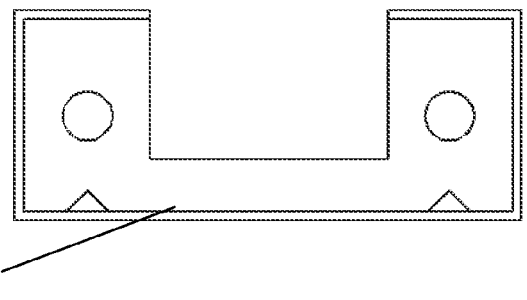
FIGS. 10A-10J, steps of a method according to another embodiment of the invention.
Figure 10B:
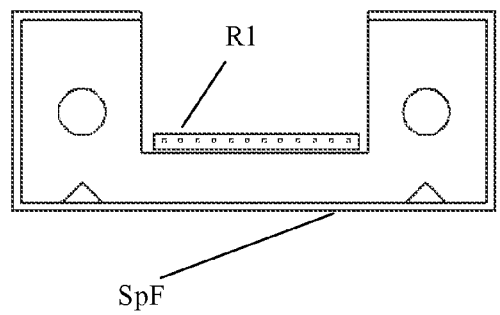

First, a receptacle SpF is provided, step 10 (FIG. 10A).

Then, a first ribbon R1 is positioned therein, step 21 (FIG. 10B), as further shown in FIG. 9. Note that the thickness of the ribbon R1 is typically smaller than the vertical pitch Pv.

Figure 10C:
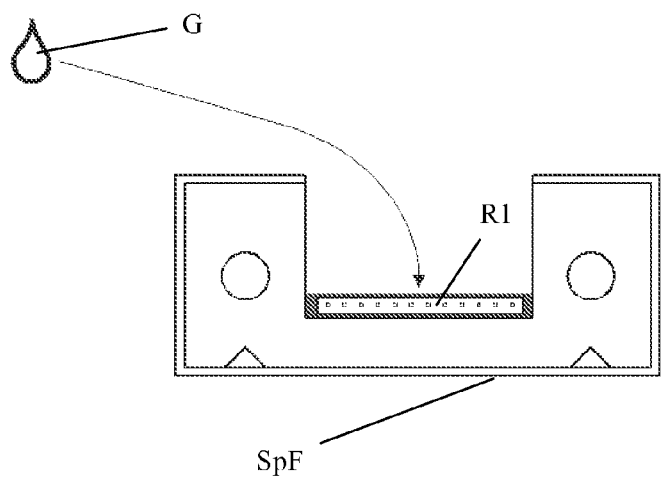

Preferably, an adhesive G is exposed to an upper surface of the positioned layer, step S22 in FIG. 10C. This adhesive has preferably a low viscosity in order to flow easily.

Figure 10D:
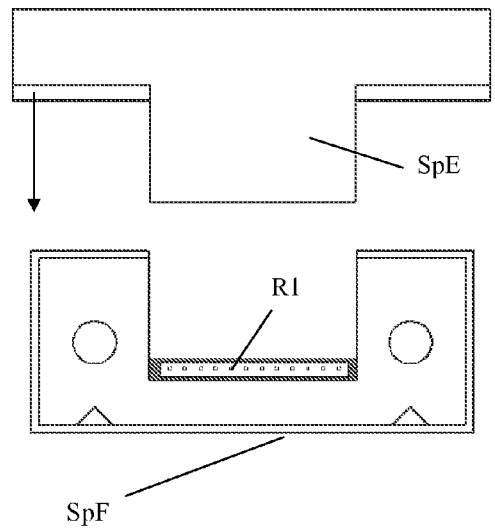
Figure 10E:
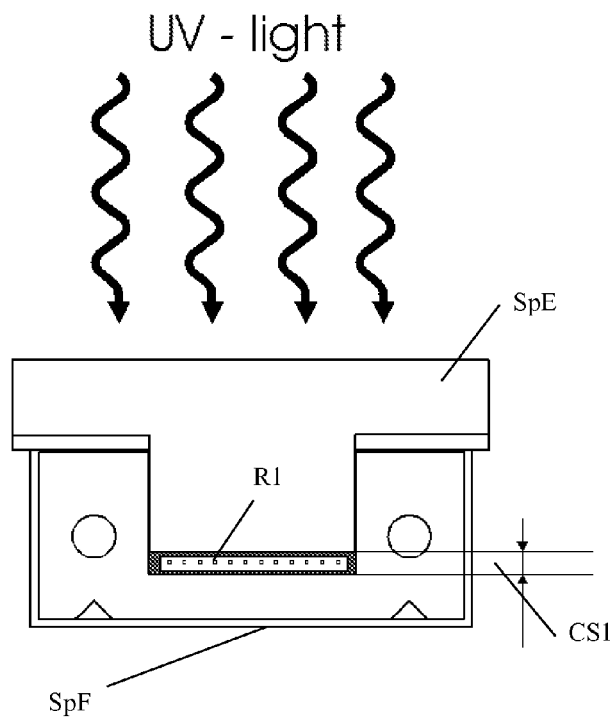

Next, a portion of the stamp SpE is engaged in the receptacle SpF, until a calibrated space position is achieved (step S23 to step S50, FIGS. 10D-E). In particular here, the stamp is dimensioned and shaped such that this position is automatically achieved at travel end. The height of the calibrated space corresponds to 1×Pv (vertical pitch), as indicated in the drawing.

As in the first embodiment, the spatial arrangement of the ribbon is constrained by components of the spacer. In addition, the adhesive G shall naturally fills in vacant space and thus participates in distributing the constraint applied. The layer results to be more evenly distributed, whereby better precision is achieved in its positioning, and in the overall pitch.

At present, the adhesive can be cured, e.g. by UV light, whereby the current layer end portion is set. Incidentally, the adhesive used to fill up the gap can for example simply be the cladding material itself. This material has a number of advantages: it has adhesive properties, a low viscosity, is UV curable, and skips the need of using an additional material, which is advantageous for large production.

Now, the adhesive G does not need to be necessarily UV curable. It can be standard oxidation glue, or a thermally curable adhesive.

Considering yet UV curable glue, the stamps is preferably transparent for the corresponding wavelength, whereby a simple set-up is obtained. For example, stamps could be made out of quartz.

Remarkably, since the adhesive G has filled up the vacant space, the upper surface of the layer corresponds substantially to that of the lower wall of the stamp. Accordingly, the positioning of the ribbon in the next layer is made independent of the current ribbon. This is schematically depicted in FIG. 2.

In this respect, in order to avoid that the stamp sticks to the adhesive after curing, at least the stamp surfaces in contact with the adhesive could have an anti-sticking coating, e.g. a fluorinated coating. Such a layer could for instance be deposited by plasma deposition or any other suitable techniques.

After curing the adhesive, the stamp is removed. Since the stamp is likely to be reusable, its coating might exhibit some fatigue at some point. However, as techniques such as plasma deposition are simple processes, this should not be a major drawback—in self assembling, dipping the stamp into a polymer solution is sufficient. Being able to re-use the stamps is specifically advantageous when going into high volume production. This, mainly because it needs to be manufactured with high accuracy.

Figure 10F:
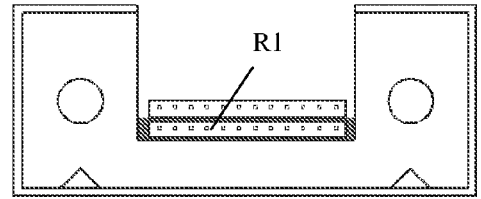
Figure 10G:
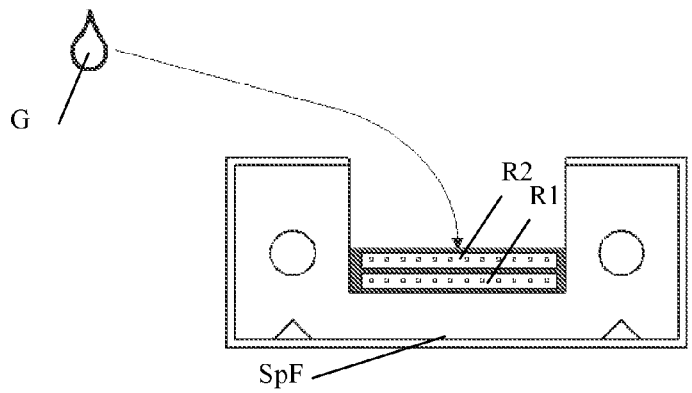
Figure 10H:
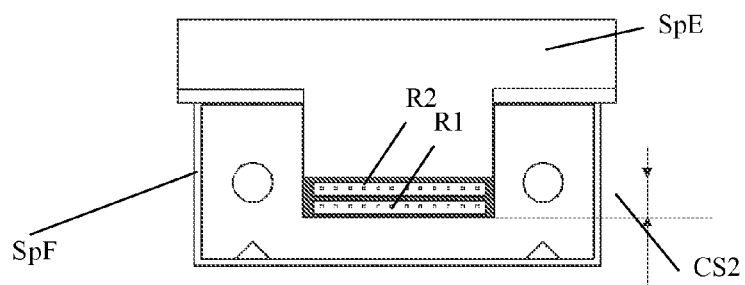
Figure 10I:
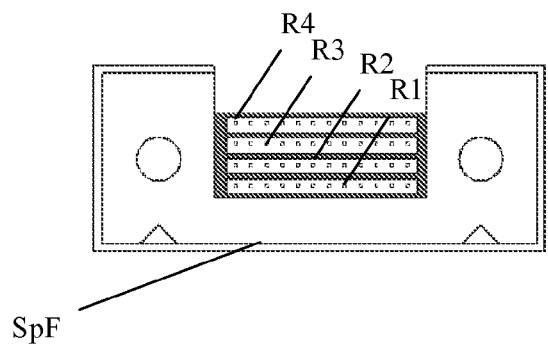
Figure 10J:
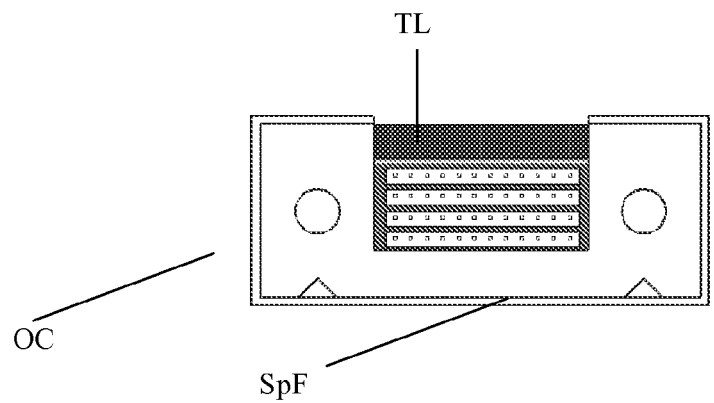

Finally, the previous steps can be repeated as necessary, should one need to adapt or change the stamp each time, as illustrated in FIGS. 10F-10H for a second ribbon layer R2. FIG. 10I illustrates accordingly an assembled stack of four flexible optical waveguide ribbons Rn (n=1 to 4).

Concerning the finishing of the top layer TL (FIG. 10J), some traditional adhesive are preferably added on top of the waveguide stack. If needed, an additional piece of ferrule can be added on top, in order to close the ferrule and to make its shape compliant with some used standard. Then the adhesive on top of the stack can be cured, e.g. by oxidization or thermally.

Comments are in order.

In the solution proposed above, the ribbon is likely designed such that its thickness is smaller then the desired vertical pitch Pv. After inserting such a ribbon in e.g. a ferrule, some fluid adhesive is added on top (this can be e.g. a cladding material, as noted). The clearance defined by the spacer corresponds to the desired waveguide pitch. Interestingly, the present embodiment allows for the excess fluid to be easily flushed out, e.g. on the front and the back of the receptacle.

As also mentioned before, an advantage of this technique is that the fabrication tolerances of the individual waveguide ribbons do not sum-up when the ribbons are stacked.

Typical numbers for the alignment accuracy which needs to be achieved between multimode waveguides is maximally ±5 µm. On the other hand, the fabrication accuracy of the ribbon thickness might typically be ±1 to 2 µm (or worse), hence the weakness of stacking ribbons of fixed thicknesses.

Another advantage of the present approach is that the thickness tolerance of a current stamp may at most influence the current and the next layer but it does not affect higher layers. Thus the fabrication inaccuracies do not sum over the stack.

An additional advantage is that due to the adhesive, each of the individual layers are mechanically attached to the ferrule, in contrast with approaches wherein a critical glue step is involved a posteriori, when all layers are in place.

This is all the more advantageous when the assembled stack of flexible optical waveguide ribbons is used in an optical connector OC (see FIG. 10J), as in an embodiment of the invention. In this case, the ferrule SpF is e.g. a connector ferrule.

A further advantage is that the fabrication of the waveguides ribbons becomes easier and thus more cost effective, since the overall thickness does not need too be controlled as accurately as in methods known in the prior art, wherein thickness control of a single layer requires e.g. complex feed-back deposition.

Still another advantage of the above technique is that the ferrule design is much simpler compared to designs required in techniques based on thickness controlled waveguide ribbons.

While the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims. For example, the present invention may be contemplated for applications extending beyond optical connectors. In addition, the skilled person may appreciate that particulars of one of the main embodiments may be applied to the other one.

The invention claimed is:

1. A method for assembling flexible optical waveguide ribbons, the method comprising steps of:
providing a ribbon stack comprising at least two optical waveguide ribbons stacked onto each other, and a spacer having a hollow space configured to receive a portion of said ribbon stack and a plurality of calibrated spaces extending through a side wall of said spacer, each of said plurality of calibrated spaces configured to receive a free-standing portion of each of said optical waveguide ribbons, wherein said plurality of calibrated spaces are defined by a plurality of tongues having first ends aligned with said side wall of said spacer and second ends that are opposite to said first ends vertically aligned with each other;
positioning said ribbon stack in said hollow space of said spacer;
constraining positioned ribbon stack in said plurality of calibrated spaces by receiving said free-standing portion of each of said optical waveguide ribbons in a respective one of said plurality of calibrated spaces, a portion of said free-standing portion of each of said optical waveguide ribbons located outside said side wall of said spacer; and
fixing constrained ribbon stack in said plurality of calibrated spaces.

2. The method according to claim 1, wherein said optical waveguide ribbons are fixed by an adhesive in said spacer.

3. The method according to claim 2, wherein said step of constraining further comprises the step of:
filling said adhesive in said spacer.

4. The method according to claim 1, further comprising the steps of:
providing said free-standing portion at one end of each optical waveguide ribbon, wherein said spacer comprises a plurality of recesses that defines respective said calibrated spaces;
inserting each of said free-standing portions in said respective one of said plurality of recesses; and
fixing said constrained ribbon stack in said respective one of said plurality of recesses.

5. The method according to claim 4, wherein each of said optical waveguide ribbons further comprises a substrate and a cladding present on the substrate, the method further comprising a step of:

preparing each of said free-standing portions by partially removing or delaminating said substrate at said one end of each of said optical waveguide ribbons from a side of said substrate opposite to said cladding, wherein optical waveguides are arranged in said cladding, and wherein a top surface of each of said free-standing portions is coplanar with a top surface of said cladding and said bottom surface of each of said free-standing portions is located above a bottom surface of said substrate at another end of each of said optical waveguide ribbons.

6. The method according to claim 5, further comprising a step of:

cutting said portion of said free-standing portion of each optical waveguide ribbon located outside said side wall of said spacer.

7. The method according to claim 6, wherein said spacer is provided as a ferrule with through hole recesses integrated therein.

8. The method according to claim 1, wherein said spacer comprises a receptacle and a spacer element.

9. The method according to claim 8, wherein said step of constraining further comprises the steps of:

exposing said positioned ribbon stack to an adhesive; and curing said adhesive.

10. The method according to claim 9, wherein said step of constraining further comprises the step of:

irradiating said adhesive through said spacer element.

11. The method according to claim 1, wherein said spacer is calibrated so that a tolerance in positioning, after fixing, one of said optical waveguide ribbons is less than ±10 µm.

12. The method according to claim 1, wherein:

an assembled stack of flexible optical waveguide ribbons is obtained; and each of ribbon end sections at an end section of said assembled stack is calibrated in a respective calibrated section.

13. The method according to claim 12, wherein an optical connector comprises said assembled stack.

14. The method according to claim 1, wherein each of said plurality of tongues has a flat top surface and a curved bottom surface, said flat top surface of one of said plurality of tongues and said curved bottom surface of adjacent one of said plurality of tongues defining one of said plurality of calibrated spaces.

15. The method according to claim 14, wherein said flat top surface of each of said plurality of tongues contacts a bottom surface of another portion of said free-standing portion of each of said optical waveguide ribbons.

16. A device for assembling flexible optical waveguide ribbons, comprising:

a spacer having a hollow space configured to receive a portion of a ribbon stack comprising at least two optical waveguide ribbons and a plurality of calibrated spaces extending through a side wall of said spacer, each of said plurality of calibrated spaces configured to receive a free-standing portion of each of said optical waveguide ribbons, wherein said plurality of calibrated spaces are defined by a plurality of tongues having first ends aligned with said side wall of said spacer and second ends that are opposite to said first ends vertically aligned with each other;

said spacer is configured to allow:

positioning of optical waveguide ribbons in said hollow space of said spacer;

constraining of each of said optical waveguide ribbons in a respective one of said plurality of calibrated spaces by receiving said free-standing portion of each of said optical waveguide ribbons in said respective one of said plurality of calibrated spaces, a portion of said free-standing portion of each of said optical waveguide ribbons located outside said side wall of said spacer; and fixing of said optical waveguide ribbons.

17. The device according to claim 16, wherein said plurality of tongues are arranged substantially parallel to each other.

18. The device according to claim 16, wherein each of said plurality of tongues has a flat top surface and a curved bottom surface, said flat top surface of one of said plurality of tongues and said curved bottom surface of adjacent one of said plurality of tongues defining one of said plurality of calibrated spaces.

19. The device according to claim 18, wherein said flat top surface of each of said plurality of tongues contacts a bottom surface of another portion of said free-standing portion of each of said optical waveguide ribbons.

* * * * *